United States Patent
Yin et al.

(10) Patent No.: US 10,161,791 B2
(45) Date of Patent: Dec. 25, 2018

(54) MEASUREMENT OF DISPLAY CHARACTERISTICS OF ELECTRONIC DISPLAY PANEL USING OPTICAL TAPERS

(71) Applicant: Facebook Technologies, LLC, Menlo Park, CA (US)

(72) Inventors: Ye Yin, Pleasanton, CA (US); Simon Hallam, San Jose, CA (US); Shizhe Shen, San Mateo, CA (US); Evan M. Richards, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 164 days.

(21) Appl. No.: 15/385,776

(22) Filed: Dec. 20, 2016

(65) Prior Publication Data

US 2018/0172509 A1    Jun. 21, 2018

(51) Int. Cl.
| | |
|---|---|
| *G01J 3/02* | (2006.01) |
| *G02B 26/08* | (2006.01) |
| *G01J 1/04* | (2006.01) |
| *F21V 8/00* | (2006.01) |
| *G02B 5/02* | (2006.01) |

(52) U.S. Cl.
CPC .......... *G01J 3/0218* (2013.01); *G01J 1/0425* (2013.01); *G02B 26/08* (2013.01); *G02B 5/0278* (2013.01); *G02B 6/0005* (2013.01)

(58) Field of Classification Search
CPC ...... G01J 3/0218; G01J 1/0425; G02B 26/08; G02B 5/0278; G02B 6/0005
USPC ....................................... 250/227.11
See application file for complete search history.

(56) References Cited

U.S. PATENT DOCUMENTS

| | | | |
|---|---|---|---|
| 8,013,831 B2 * | 9/2011 | Sampsell | G02B 26/001 345/102 |
| 2009/0141515 A1 * | 6/2009 | Wu | G02B 6/001 362/555 |

* cited by examiner

*Primary Examiner* — Seung C Sohn
(74) *Attorney, Agent, or Firm* — Fenwick & West LLP (57) ABSTRACT

An apparatus for measuring characteristics of an electronic display panel includes an array of optical elements. Each optical element has a first surface and a second surface. The first surface faces the electronic display panel and receives light from pixels of the electronic display panel. The second surface faces away from the electronic display panel and has an area smaller than the area of the first surface. The second surface emits a combined version of the light received by the first surface. The apparatus further includes a light sensor facing the second surface to measure one or more parameters of the emitted light.

18 Claims, 6 Drawing Sheets

MEASUREMENT OF DISPLAY CHARACTERISTICS OF ELECTRONIC DISPLAY PANEL USING OPTICAL TAPERS

BACKGROUND

Field of the Disclosure

The present disclosure generally relates to electronic display panels, and specifically to measuring display characteristics of such electronic display panels. These spatial non-uniformities reduce user experience and immersion in a VR environment.

Description of the Related Arts

An electronic display panel includes a display surface having pixels that display a portion of an image by emitting one or more wavelengths of light from one or more sub-pixels. During the manufacturing process, various factors cause non-uniformities in luminance, radiance, or chrominance of light emitted by pixels and sub-pixels. For example, variations in flatness of a carrier substrate, variations in a lithography light source, temperature variations across the substrate, or mask defects may result in the electronic display panel having transistors with non-uniform emission characteristics. As a result, different sub-pixels driven with the same voltage and current will emit different intensities of light (also referred to as brightness). Variations that are a function of position on the electronic display panel cause different display regions of the electronic display panel to have different luminance, radiance, or chrominance. If these errors systematically affect sub-pixels of one color more than sub-pixels of another color, then the electronic display panel has non-uniform color balance as well. These spatial non-uniformities of luminance, radiance, and chrominance decrease image quality and limit applications of the electronic display panel. For example, virtual reality (VR) systems typically include an electronic display panel that presents virtual reality images. These spatial non-uniformities reduce user experience and immersion in a VR environment.

SUMMARY

Embodiments relate to measuring characteristics of an electronic display panel. A measuring apparatus includes an array of optical elements. Each optical element includes a first surface facing the electronic display panel to receive light from pixels of the electronic display panel. Each optical element further includes a second surface facing away from the electronic display panel to emit a combined version of the light received by the first surface. The area of the second surface is smaller than the area of the first surface. The apparatus further includes light sensors facing the second surface of each of the optical elements to measure parameters of the emitted light.

In one embodiment, the apparatus includes a light diffuser between the second surface and the light sensors to diffuse the emitted light.

In one embodiment, each optical element is a fiber optic taper or lightpipe.

In one embodiment, each optical element is funnel shaped.

In one embodiment, each optical element has a curved side surface that extends between the first surface and the second surface.

In one embodiment, the array of optical elements covers an entire display surface of the electronic display panel.

In one embodiment, the first surfaces have a collective area smaller than an area of a display surface of the electronic display panel and an actuator moves the array of optical elements in a direction parallel to the display surface of the electronic display panel.

In one embodiment, the length of the array of optical elements coincides with the length of the display surface of the electronic display panel, and the actuator moves the array of optical elements between an edge of the display surface and an opposite edge of the display surface.

In one embodiment, the measured parameters include at least luminance, radiance, or chrominance.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is described herein with reference to the figures where like reference numbers indicate identical or functionally similar elements. Also in the figures, the left most digits of each reference number corresponds to the figure in which the reference number is first used.

Embodiments relate to measuring characteristics, including luminance, radiance, and chrominance of an electronic display panel. An array of optical elements receives light from pixels of a display surface of an electronic display panel, combines the light received from the pixels, and emits the light combined by each optical element to light sensors for measuring parameters of the emitted light. Each optical element in the array includes a first surface and a second surface. The first surface of each optical element faces the electronic display panel and receives light from pixels of the display surface. The second surface of each optical element faces away from the electronic display panel and has an area smaller than the area of the first surface. The second surface emits a combined version of the light received by the first surface. Light sensors face the second surface of each optical element to measure the parameters of the light emitted from the second surfaces of the array of optical elements.

An optical element described herein refers to an optically transparent element that manipulates light so that light received from a larger area is mixed or combined and emitted through a smaller area. Each optical element may combine the light received from a region of multiple pixels by magnifying the light received from the pixels of the display surface, mixing the light received from the pixels, mode-matching or mode-filtering the light received from the pixels, homogenizing light from the pixels by total internal reflection (TIR), etc. The optical element may be, for example, a fiber optic taper or a lightpipe.

A light sensor described herein refers to a sensor for measuring characteristics of light. The light sensor may be a light-to-photocurrent sensor, light-to-analog voltage sensor, light to-digital sensor, photodiode, etc.

Overview of Measurement System

Embodiments disclosed herein relate to rapid measurement of the light from pixels of the display surface of an electronic display panel having a high pixel-per-inch (PPI) resolution for performing external compensation to improve the overall uniformity and performance of the electronic display panel. For calibrating the electronic display panel, a measurement system including an array of optical elements is placed above the electronic display panel for measuring parameters of the light emitted by individual pixels as well as parameters of light emitted by a region of multiple pixels. Each optical element may combine the light received from a region of pixels and emit the combined light to light sensors for measuring parameters of the emitted light.

During the manufacturing process of an electronic display panel, non-uniformities may exist across the display surface of the electronic display panel. For example, non-uniformities may arise due to one or more of: threshold voltage variation of thin-film transistors (TFTs) that drive pixels of the electronic display panel, mobility variation of the TFTs, aspect ratio variations in the TFT fabrication process, power supply voltage variations across panels (e.g., IR-drop on panel power supply voltage line), and age-based degradation. The nature of non-uniformity could be in either luminance or radiance (e.g., if there are dim portions of the display surface when displaying a solid single color image) or chrominance (e.g., if the color looks different when displaying a solid single color image).

The non-uniformity of the electronic display panel represents a pixel-to-pixel (or sub-pixel to sub-pixel) variation of luminance, radiance, or chrominance of the electronic display panel when the electronic display panel is provided with the same known input radiance, and chrominance. A host system may use a non-uniformity calibration matrix to compensate for non-uniformities of the electronic display panel. A calibration module may create a non-uniformity calibration matrix based on the measurements of the disclosed system. The non-uniformity calibration matrices include measurements for luminance, radiance, and chrominance outputs across the electronic display panel, representative of the pixel responses to the same known (predetermined) input (luminance, radiance, and chrominance) provided. These calibration matrices include correction factors associated with one or more attributes of the electronic display panel such as luminance, radiance, and chrominance.

The non-uniformity calibration maps or matrices may include calibration data for low frequency non-uniformity as well as high frequency non-uniformity across the electronic display panel. The low frequency non-uniformity refers to a variation of luminance, radiance, or chrominance levels across various regions of the entire display surface of the electronic display panel. For example, a luminance, radiance, or chrominance variation between the regions in the left top corner and the right bottom corner of the electronic display panel is low frequency non-uniformity. The high frequency non-uniformity refers to a pixel to pixel variation or a sub-pixel to sub-pixel variation of the attributes of the electronic display panel. The non-uniformity calibration maps or matrices may be stored in persistent data storage of a non-uniformity calibration system such as a calibration store.

In conventional 2D imaging colorimeters, the measurements are typically taken using a single camera system with a built-in filter wheel. In such conventional schemes, the measurement process is slow because of the loss of light due to radiometric transfer, and moreover, the measured parameters of individual pixel are further processed to obtain the low frequency non-uniformity data. In the embodiments disclosed herein, the optical elements may be located close to the electronic display panel and transmit the light from the pixels of the electronic display panel to the light sensors with little loss and also obviates further processing to obtain the low frequency non-uniformity data. Therefore, the embodiments disclosed herein provide, among other advantages, improved efficiency of the measurement of low frequency non-uniformity data for regions of the display panel including multiple pixels.

Example Array of Optical Elements

Figure 1:
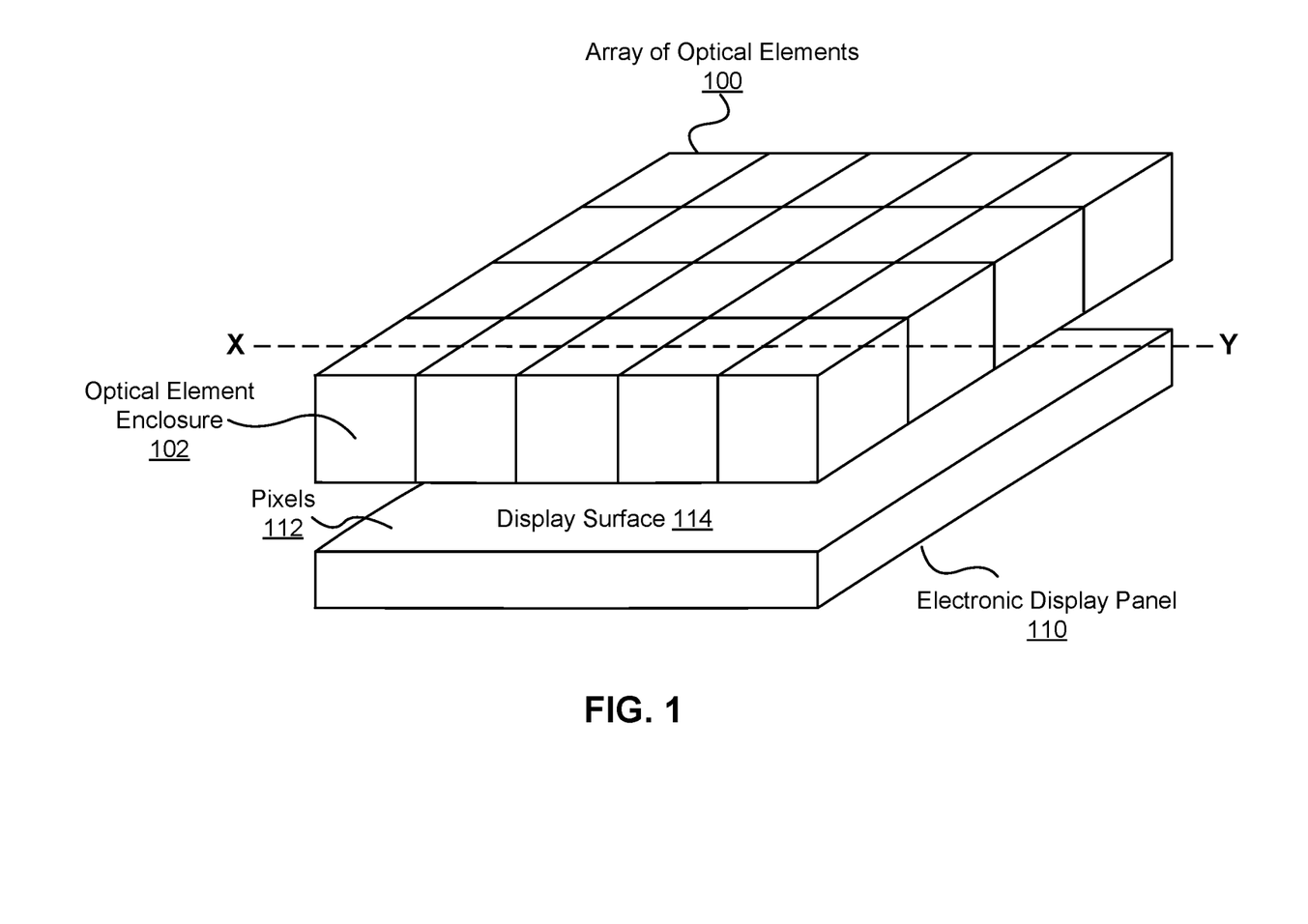
FIG. 1 is a schematic perspective view of a measurement system in which an array of optical elements is placed above a display panel, in accordance with an embodiment.

FIG. 1 is a schematic perspective view of a measurement system in which an array of optical elements 100 is placed above an electronic display panel 110, in accordance with an embodiment. In this embodiment, the array of optical elements 100 is an M×N array including M rows of N columns of optical element enclosures 102 each. In the example array 100 shown in FIG. 1, M equals 4 and N equals 5. The array of optical elements 100 may be a tiled array of optical element enclosures 102 that are machined square or rectangular and epoxied together to form the array 100. The array of optical elements 100 may cover an entire display surface 114 of the electronic display panel 110.

Each optical element enclosure 102 shown in FIG. 1 in the array of optical elements 100 includes an optical element and filling material, as described below in detail with reference to FIG. 2. The optical element within each optical element enclosure 102 receives light from corresponding pixels 112 arranged in a corresponding region on the display surface 114 of the electronic display panel 110. Each optical element may receive light from a single pixel on the display surface 114 of the electronic display panel 110 or receive light from a region of the display surface 114 including more than one pixel 112. The optical element within each optical element enclosure 102 further combines the light received from pixels 112 and emits a combined version of the light received by the optical element. Each optical element may be a fiber optic taper that combines light by magnifying the light received from the pixels 112 of the electronic display panel 110, as described below in detail with reference to FIGS. 3A and 3B. Each optical element may be a lightpipe that combines light by channeling light from corresponding pixels 112 by TIR to ensure a uniform and evenly homogenized light at the end of the lightpipe facing away from the electronic display panel 110.

Examples of the electronic display panel 110 shown in FIG. 1 include a liquid crystal display (LCD), an organic light emitting diode (OLED) display, and an active-matrix organic light-emitting diode display (AMOLED). The electronic display panel 110 includes a plurality of pixels 112, which may each include a plurality of sub-pixels (e.g., a red sub-pixel, a green sub-pixel, etc.), where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display panel 110 are rendered on the sub-pixel level. This is distinct from, say an RGB (red-green-blue) layout, which has discrete red, green, and blue pixels (red, green, and blue) and each pixel 112 in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel 112 is restricted to working within that pixel 112. However, in some embodiments, sub-pixels in the electronic display panel 110 operate within multiple "logical" pixels 112 in their surrounding vicinity to form different colors. The sub-pixels are arranged on the display surface 114 of the electronic display panel 110 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels on the display surface 114 are of the same color.

During manufacturing test, a hardware or software test controller module, as described below in detail with reference to FIG. 4, may interface with an automated positioning tool called a handler that physically positions the array of optical elements 100 shown in FIG. 1 above the electronic display panel 110, which is one of several display panels on a moving assembly line of display panels. The handler may interact with an interlocking mechanism on the assembly line to position the array of optical elements 100 above each electronic display panel 110 to measure parameters of light emitted by pixels 112 of the electronic display panel 110.

Figure 2:
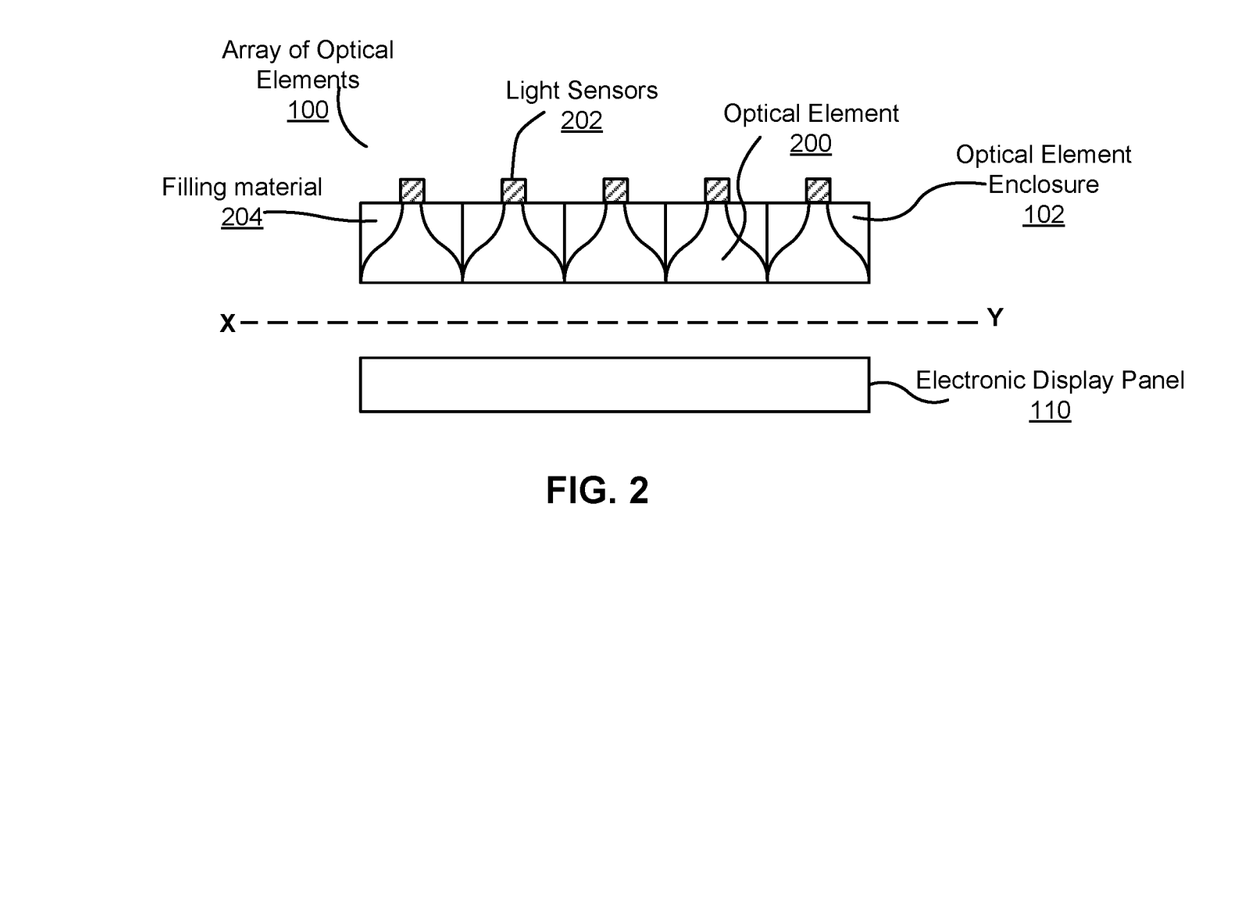
FIG. 2 is a cross sectional view of an array of optical elements taken along line X-Y in FIG. 1, in accordance with an embodiment.

FIG. 2 illustrates a cross sectional view of the array of optical elements 100 taken along line X-Y of FIG. 1, in accordance with an embodiment. The cross section shown in FIG. 2 includes the array of optical elements 100 and the electronic display panel 110. The array of optical elements 100 includes one or more optical element enclosures 102. The array of optical elements 100 may be a tiled array of optical element enclosures 102 that are machined square or rectangular and epoxied together to form the array. In one example, the bonding gap width between optical element enclosures 101 is 50 through 100 μm.

Each optical element enclosure 102 shown in FIG. 2 in the cross section of the array of optical elements 100 includes an optical element 200 and filling material 204. The optical element 200 may be funnel shaped. The optical element 200 within each optical element enclosure 102 receives light from the corresponding pixels 112 arranged in a region of the display surface 114 of the electronic display panel 110, combines the light received from pixels 112, and emits a combined version of the light received by the optical element 200. Each optical element 200 may be a fiber optic taper that combines light by magnifying the light received from the pixels 112 of the electronic display panel 110, as described below in detail with reference to FIG. 3A. Each optical element 200 may be a lightpipe that combines light by homogenizing light from corresponding pixels 112 by TIR, as described below in detail with reference to FIG. 3A. The filling material 204 surrounding each optical element 200 within each optical element enclosure 102 shown in FIG. 2 may be cladding glass having a low refractive index. In one example, the cladding glass is pure glass ($SiO_2$), plastic, or a combination of both. The filling material 204 may be a polymer layer of polyurethane (PVC), a layer of silicone or epoxy resin, fiberglass, a layer of Kevlar, etc.

The measurement system shown in FIG. 2 may further include one or more light sensors 202 facing the narrower end of each of the optical elements 200 to measure one or more parameters of the light emitted from the narrower end of each optical element 200, such as luminance, radiance, and chrominance. The light sensors 202 may be light-to-photocurrent, light-to-analog voltage, light to-digital sensors, etc. The light sensors 202 may be located inside or outside each optical element enclosure 102. The light sensors 202 may measure the spectral energy distribution of the light emitted by each optical element 200, including the radiometric, photometric, and the colorimetric quantities of light.

Example Optical Elements

Figure 3A:
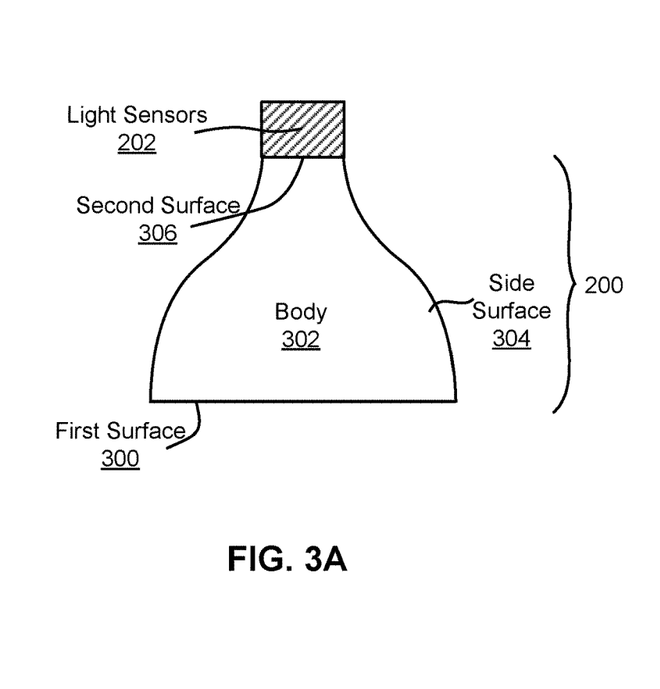
FIG. 3A is a cross-sectional view of an optical element in accordance with an embodiment.

FIG. 3A is a cross-sectional view of the optical element 200 in accordance with an embodiment. The optical element 200 includes a body 302 defined by a first surface 300, a side surface 304, and a second surface 306. One or more light sensors 202 are located on the optical element 200 so that their sensing surfaces face the second surface 306 of the optical element 200. The first surface 300 of the optical element 200 faces the display surface 114 of the electronic display panel 110 and receives light from a plurality of pixels 112 of the electronic display panel 110. The first surface 300 has an area that covers a region of multiple pixels 112 in the display surface 114 of the electronic display panel 110. The body 302 of the optical element 200 combines the light received at the first surface 300. The second surface 306 faces away from the electronic display panel 110 and emits a combined version of the light received by the first surface 300 such that parameters of the combined light are measured by the sensors 202. The optical element 200 has a curved side surface 304 that extends between the first surface 300 and the second surface 306. The optical element 200 may be funnel shaped.

The optical element 200 shown in FIG. 3A may be a fiber optic taper or a lightpipe, known as an integrator bar, homogenizing rod, or homogenizer. A fiber optic taper is an optical fiber in which the cross section, i.e., the cross-sectional diameter or area, decreases monotonically with length as shown in FIG. 3A. A lightpipe is a hollow structure that transmits light by its reflective lining or a transparent solid that transmits light by TIR. The second surface 306 of the optical element 200 has an area that is smaller than the area of the first surface 300. The interior body 302 of the optical element 200 may be made of pure silica glass combined with germanium tetrachloride, optical quartz glass manufactured by fusion of natural quartz crystals in an electrically heated furnace, high purity synthetic amorphous silicon dioxide manufactured by flame hydrolysis, etc.

The body 302 of the optical element 200 shown in FIG. 3A combines light received at the first surface 300 from pixels 112 of a region of the display surface 114 of the electronic display panel 110 by magnifying the received light. The optical element 200 may combine light from the pixels 112 by mixing the spectral characteristics of the different chromaticity coordinates of red, green, and blue sub-pixels of the electronic display panel 110. The optical element 200 may combine light from the pixels 112 by mode-matching-creating a spatial overlap of the intensity profiles and matching the phase profiles of the light received at the first surface 300 and the light emitted at the second surface 306. The optical element 200 may combine light from the pixels 112 by mode-filtering-selectively transmitting light of different wavelengths while blocking the remainder. The optical element 200 may pass long wavelengths only (long-pass), short wavelengths only (short-pass), or a band of wavelengths, blocking both longer and shorter wavelengths (band-pass). The optical element 200 may combine light from the pixels 112 by transforming non-uniform light received at the first surface 300 from corresponding pixels 112 arranged on the display surface 114 of the electronic display panel 110 by TIR to ensure a uniform and evenly homogenized emitted light at the second surface 306. The refractive index of the body 302 determines the critical angle of the optical element 200, which defines the angle of acceptance at which TIR occurs. The optical element 200 may combine light from the pixels 112 by increasing the intensity of the light from corresponding pixels 112. The optical element 200 may combine light from the pixels 112 by developing specific spectral profiles of the light from corresponding pixels 112.

The one or more light sensors 202 shown in FIG. 3A facing the second surface 306 of the optical element 200 measure one or more parameters of the light from the optical element 200, such as luminance, radiance, and chrominance. The light sensors 202 shown in FIG. 3A may be light-to-photocurrent, light-to-analog voltage, light to-digital sensors, etc. The light sensors 202 may incorporate a transimpedance amplifier and provide voltage outputs. The light sensors 202 may include an array of photodiodes behind color filters and an integrated current-to-voltage conversion circuit. Emitted light from the optical element 200 received by the light sensors 202 may be converted into a photocurrent, the magnitude of which depends on the brightness and wavelength of the light emitted at the second surface 306. The light sensors 202 may result in a spectral response for the filtered photodiode array that mimics that of the human eye. The photocurrents from each of the photodiodes may be converted to output voltages by a current-to-voltage converter and sent to a computing device.

The light sensors 202 shown in FIG. 3A may measure the spectral energy distribution of the light emitted by the optical element 200, including the radiometric, photometric, and the colorimetric quantities of light. In combination with the computing device, the light sensors 202 may record the radiation spectrum of the emitted light and calculate the desired parameters, such as luminance, radiance, and chrominance.

Figure 3B:
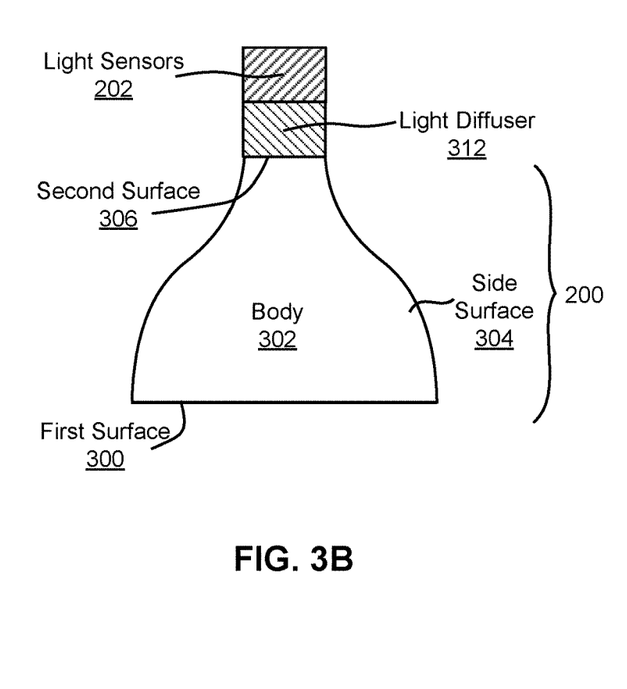
FIG. 3B is a cross-sectional view of an optical element with a light diffuser in accordance with an embodiment.

FIG. 3B is a cross-sectional view of the optical element 200 with a light diffuser 312 in accordance with an embodiment. The light diffuser 312 is located between the second surface 306 of the optical element 200 and the light sensors 202. The light diffuser 312 may diffuse the light emitted by the optical element 200 at the second surface 306 by reducing or removing high intensity bright spots. The light diffuser 312 may be made of ground glass or fused silica substrates having low scatter loss and ranging from 5 mm Diameter through 250 mm Square. The light diffuser 312 may be made of holographic material having transmission efficiency greater than 85% and having elliptical or circular diffusing outputs. The light diffuser 312 may be made of opal diffusing glass for generating a nearly Lambertian distribution of light but having a higher level of scattering loss.

Example Array of Moving Optical Elements

Figure 4:
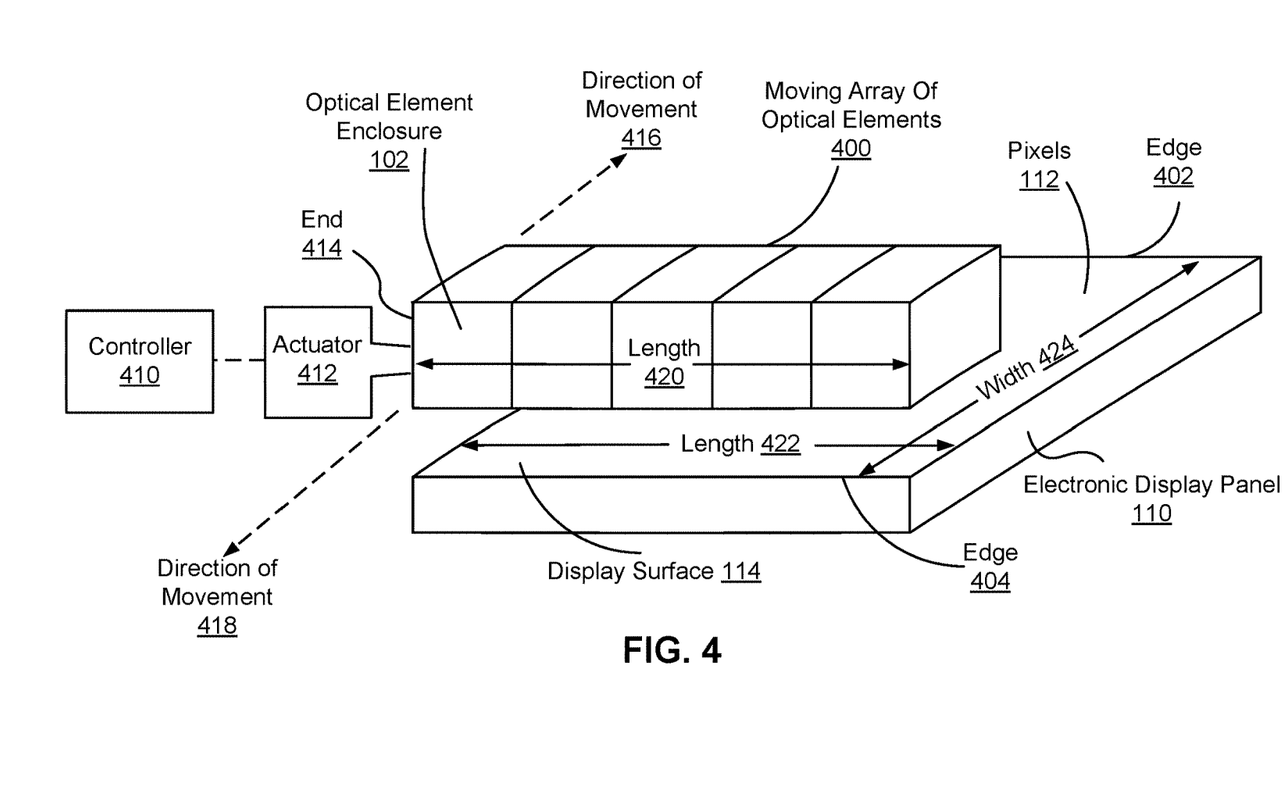
FIG. 4 is a schematic perspective view illustrating a measurement system in which an array of optical elements move relative to a display panel, in accordance with an embodiment.

FIG. 4 is a schematic perspective view of a measurement system in which a moving array of optical elements 400 is placed above the electronic display panel 110, in accordance with an embodiment. In this embodiment, the array of optical elements 400 is a 1×N array including 1 row of N optical element enclosures 102. In the example array 400 shown in FIG. 4, N equals 5.

The measurement system includes the array of optical elements 400, a controller 410, and an actuator 412. The array of optical elements 400 includes an end 414, one or more optical element enclosures 102, and a length 420. The electronic display panel 110 includes an edge 402, an opposite edge 404, pixels 112 arranged over a display surface 114, a length 422, and a width 424. Each optical element enclosure 102 in the array of optical elements 400 includes an optical element and filling material, as described above in detail with reference to FIG. 2. Each optical element in the array of optical elements 400 includes a first surface 300, a body 302, a side surface 304, and a second surface 306, as described above in detail with reference to FIG. 3A.

The optical element within each optical element enclosure 102 shown in FIG. 4 receives light from corresponding pixels 112 arranged in a corresponding region on the display surface 114 of the electronic display panel 110, as described above in detail with reference to FIG. 1. Each optical element may receive light from a single pixel on the display surface 114 of the electronic display panel 110 or receive light from a region of the display surface 114 including more than one pixel 112. Each optical element in the array of optical elements 400 includes a first surface having an area. The array of optical elements 400 includes optical elements whose first surfaces have a collective area smaller than the area of the display surface 114 of the electronic display panel 110. The array of optical elements 400 therefore receives light from pixels 112 arranged over a subset of the display surface 114. The array of optical elements 400 has a length 420 coinciding with a length 422 of the display surface 114 of the electronic display panel 110. The length 420 is the sum of lengths of each optical element enclosure 102 in the array of optical elements 400. The length 420 of the array of optical elements 400 may be less than or equal to the length 422 of the display surface 114. To measure parameters of light emitted by the display surface 114, the measurement system moves the array of optical elements 400 in a direction parallel to the display surface 114 such that parameters of light from different regions of the display surface 114 are measured.

The measurement system includes a controller 410 and an actuator 412 shown in FIG. 4 for moving the array of optical elements 400 in a direction parallel to the display surface 114 of the electronic display panel 110. The controller 410 may be a hardware device or software module connected over a wireless network or hardwired to an automated placement tool called a handler that physically positions the array of optical elements 400 above each electronic display panel 110 on a moving assembly line of display panels. In alternative embodiments, the controller 410 operates as a standalone device or a connected (e.g., networked) device that connects to other machines. The controller 410 may be a server computer, a client computer, a personal computer (PC), a tablet PC, or any machine capable of executing instructions (sequential or otherwise) that specify actions to be taken by the handler, actuator 412, and array of optical elements 400. The controller 410 includes one or more processing units (generally processor), for example, a central processing unit (CPU), digital signal processor (DSP), state machine, one or more application specific integrated circuits (ASICs), one or more radio-frequency integrated circuits (RFICs), etc. The controller 410 may also include a main memory and a storage unit. The controller 410 executes instructions, e.g., program code or software, for causing the actuator 412 and array of optical elements 400 to perform any one or more of the methodologies (or processes) described herein.

The handler may be equipped with automatic pattern recognition optics capable of aligning the array of optical elements 400 with sufficient accuracy to ensure accurate registration between the optical elements and regions of pixels 112 on the display surface 114. The array of optical elements 400 positioned by the handler may be indexed to each electronic display panel 110 for measuring its characteristics during manufacturing test. The handler operation may be monitored by the controller 410. The measurement system may be operated in either automatic or manual modes. Manual operation allows for diagnostics sequences to be run, measurement set-up changes to be entered, and mechanical adjustments to be made at the operator's convenience before, during, and after automatic measurement operation. Automatic operation may cycle electronic display panels 110 under the array of optical elements 400. The handler will stop when there is no display panel available but re-start automatically when more electronic display panels 110 are loaded on the assembly line.

The actuator 412 shown in FIG. 4 is operably coupled to the end 414 of the array of optical elements 400 for moving the array 400 over the electronic display panel 110. The actuator 412 moves the array of optical elements 400 between the edge 402 of the display surface 114 and the opposite edge 404 of the display surface 114 along the width 424 of the electronic display panel 110 such that light from pixels 112 arranged in different regions of the display surface 114 are received by the array of optical elements 400. The actuator 412 may move the array of optical elements 400 in a direction of movement 416 towards the edge 402 of the electronic display panel 110 or in a direction of movement 418 towards the edge 404 of the electronic display panel 110. The actuator 412 receives a control signal from the controller 410 in the form of electric voltage or current, pneumatic or hydraulic pressure, etc. When the control signal is received, the actuator 412 responds by converting the control signal into mechanical motion. Once the handler positions the array of optical elements 400 above the electronic display panel 110 and the actuator moves the array 400 over the electronic display panel 110 in steps, the position of the array of optical elements 400 may be tracked by motion sensors as it moves above the electronic display panel 110.

The display surface 114 of the electronic display panel 110 shown in FIG. 4 includes more than one region of pixels 112, each region having a width coinciding with a width of each optical element enclosure 102 of the array of optical elements 400. Each optical element enclosure 102 covers a region of the display surface 114 to measure parameters of light from the pixels lying in that region. The controller 410 and actuator 412 may move the array of optical elements 400 one or more region widths at a time. In one example, the display surface 114 has 20 regions arranged as a matrix of 4 rows and 5 columns. The array of optical elements 400 has 1 row of 5 optical element enclosures 102 as shown in FIG. 4. The controller 410 and actuator 412 may position the array of optical elements 400 to cover the first row of 5 regions closest to the edge 404 for measuring the parameters of light emitted by the pixels 112 in those 5 regions. The controller 410 and actuator 412 may move the array of optical elements 400 in the direction of movement 416 towards the edge 402 by one region width to cover the second row of 5 regions and measure the parameters of light emitted by the pixels 112 in the second row of 5 regions.

The controller 410 and actuator 412 shown in FIG. 4 may move the array of optical elements 400 towards the edge 402 by one region width to cover the third row of 5 regions and measure the parameters of light emitted by the pixels 112 in the third row of 5 regions. The controller 410 and actuator 412 may move the array of optical elements 400 towards the edge 402 by one region width to cover the fourth row of 5 regions and measure the parameters of light emitted by the pixels 112 in the fourth row of 5 regions. The controller 410 and actuator 412 may move the array of optical elements 400 towards the edge 402 by one region width to cover the fifth row of 5 regions and measure the parameters of light emitted by the pixels 112 in the fifth row of 5 regions.

The controller 410 may switch on and off different optical element enclosures 102 to measure parameters of light emitting from one region or a set of regions such that less than the total number of optical elements perform measurements at a time for taking fine grained measurements. When parameters of light emitting from one region or a set of regions have been measured, the actuator 412 may move the array of optical elements 400 to the next region or a set of regions for measuring parameters of light emitting from the next set. When parameters of light emitting from a specific region have been measured, the region's position may be remembered by the controller 410 or another computing device for later creating a non-uniformity calibration matrix to compensate for non-uniformities of the electronic display panel 110.

The controller 410 and actuator 412 shown in FIG. 4 may move the array of optical elements 400 by less than one region width at a time to make fine grained measurements of the parameters of light emitted by pixels 112. The controller 410 and actuator 412 may position the array of optical elements 400 to cover the first row of 5 regions closest to the edge 404 for measuring the parameters of light emitted by the pixels 112 in the first row of 5 regions. The controller 410 and actuator 412 may move the array of optical elements 400 towards the edge 402 in the direction of movement 416 by one half region width to cover half of the first row of 5 regions and half of the second row of 5 regions and measure the parameters of light emitted by the pixels 112 in the covered areas. The measurement system may combine multiple measurements of parameters of light emitted by pixels 112 in different areas of the display surface 114 and analyze the differences between measurements. The measurement system may divide the entire display surface 114 of the electronic display panel 110 into a number R of intersecting areas A and measure each parameter I (such as luminance, radiance, chrominance, etc.,) of light emitted by pixels 112 in each area A as $A_I$. The measurement system may calculate a parameter vector $P_A$ for each area A, where each element $P_{AI}$ of $P_A$ is an average of parameter differences between the area A and the other adjacent areas. When the value of an element $P_{AI}$ of $P_A$ is smaller than a predetermined threshold, it may indicate that the parameter I difference between the area A and the adjacent areas BM is below a uniformity threshold $U_T$.

A host system may use the parameter vectors $P_{AI}$ and the uniformity measurements taken by the measurement system shown in FIG. 4 to create a non-uniformity calibration matrix to compensate for non-uniformities of the electronic display panel 110. The non-uniformity calibration matrix may include measurements for parameters I such as luminance, radiance, and chrominance across areas A of the electronic display panel 110, representative of the pixel responses 112 to the same known input provided. The calibration matrix may include correction factors associated with one or more attributes of the electronic display panel 110 such as luminance, radiance, and chrominance. The correction factors of the calibration matrix may be used to correct the electronic display panel 110 variations to provide luminance, radiance, and chrominance uniformity across pixels 112 spanning the display surface 114.

Example Display Surface

Figure 5:
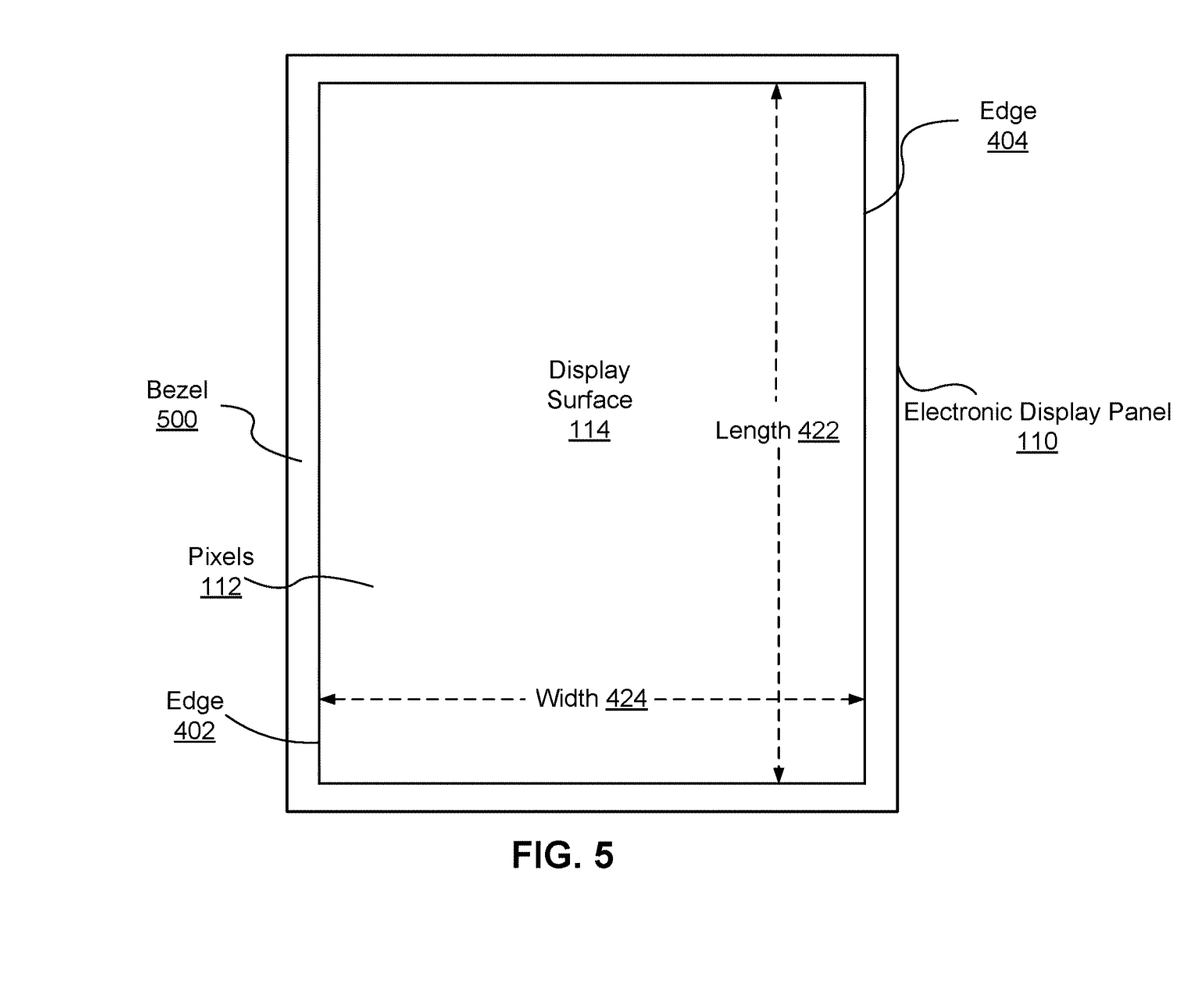
FIG. 5 is a planar view of an electronic display panel in accordance with an embodiment.

FIG. 5 is a planar view of an electronic display panel 110 in accordance with an embodiment. The planar view includes a display surface 114, pixels 112, a bezel 500, an edge 402, an edge 404, a length 422, and a width 424. The electronic display panel 110 may be an LCD, OLED, AMOLED, etc. In an LCD electronic display panel 110, the light-modulating properties of liquid crystals display arbitrary images (as in a general-purpose computer display) or fixed images with low information content, which can be displayed or hidden, such as preset words, digits, and 7-segment displays, as in a digital clock on the display surface 114. Each pixel 112 of the LCD electronic display panel 110 typically consists of a layer of molecules aligned between two transparent electrodes, and two polarizing filters (parallel and perpendicular). By controlling the voltage applied across the liquid crystal layer in each pixel 112, light can be allowed to pass through in varying amounts thus constituting different levels of gray.

In an OLED electronic display panel 110, an emissive electroluminescent layer (a film of organic compound) emits light in response to an electric current. This layer of organic semiconductor is situated between two electrodes; typically, at least one of these electrodes is transparent. In an AMOLED electronic display panel 110, an active matrix of OLED pixels 112 that are deposited or integrated onto a TFT array, which functions as a series of switches to control the current flowing to each individual pixel 112, generates light (luminescence) upon electrical activation. This continuous current flow is controlled by at least two TFTs at each pixel 112 (to trigger the luminescence), with one TFT to start and stop the charging of a storage capacitor and the second to provide a voltage source at the level needed to create a constant current to the pixel 112, thereby eliminating the need for the very high currents required for passive-matrix OLED operation.

The display surface 114 shown in FIG. 5 is the physical area where pictures and videos are displayed. The length 422 is the length of the display surface 114 and the width 424 is the width of the display surface 114 between edge 402 and edge 404. The size of the display surface 114 is usually described by the length of its diagonal, which is the distance between opposite corners, usually in inches.

Each pixel 112 arranged on the display surface 114 shown in FIG. 5 is a physical point in a raster image (the smallest addressable element in an all points addressable electronic display panel 110. The address of each pixel 112 corresponds to its physical coordinates. The pixels 112 may be arranged in a regular two-dimensional grid on the display surface 114. Other arrangements of the pixels 112 are possible. The display resolution of the electronic display panel 110 is the number of distinct pixels 112 in each dimension that can be displayed. The display resolution is usually quoted as width×height, with the units in pixels: for example, "1024×768" means the width is 1024 pixels and the height is 768 pixels.

The bezel 500, made of plastic, machined polystyrene, metal, etc., is the area of the electronic display panel 110 that surrounds the display surface 114.

Example Process of Measuring Characteristics of Display Panel

Figure 6:
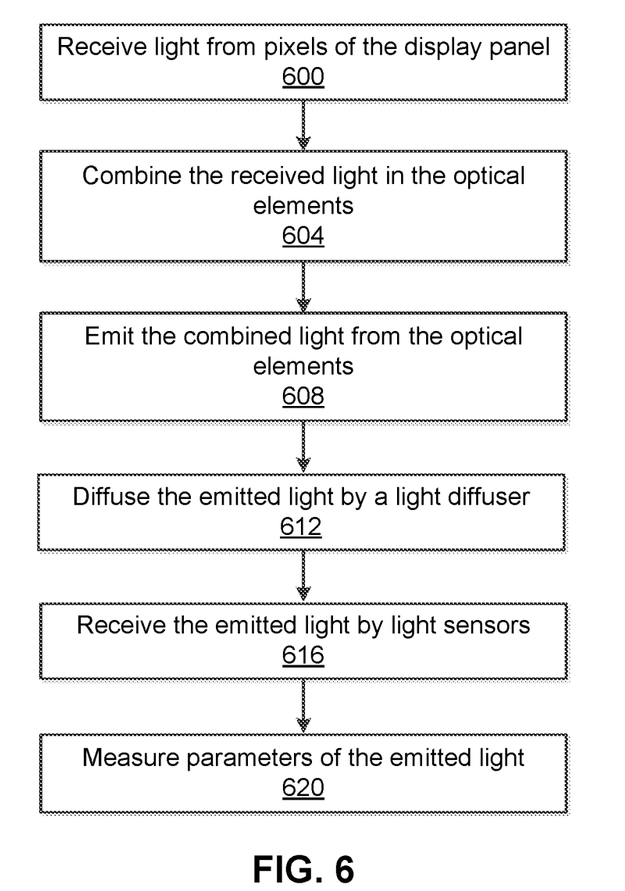
FIG. 6 is a flowchart illustrating an overall process for measuring characteristics of a display panel in accordance with an embodiment.

FIG. 6 is a flowchart illustrating an overall process for measuring characteristics of the electronic display panel 110 in accordance with an embodiment. In some embodiments, the process may have different and/or additional steps than those described in conjunction with FIG. 6. Steps of the process may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

A first surface 300 of an optical element in the measurement system faces the electronic display panel 110 and receives 600 light from pixels 112 of the display surface 114 of the electronic display panel 110. A body 302 of the optical element combines 604 the received light by one or more of magnifying the received light, mixing the spectral characteristics of the different chromaticity coordinates of red, green, and blue sub-pixels of the electronic display panel 110, mode-matching, mode-filtering, transforming non-uniform light received at the first surface 300 by TIR to ensure a uniform and evenly homogenized emitted light at a second surface 306 of the optical element, increasing the intensity of the light, developing specific spectral profiles of the light, etc. The second surface 306 of the optical element faces away from the electronic display panel 110 and emits 608 the combined light.

A light diffuser 312 made of ground glass, fused silica substrates, holographic material, opal diffusing glass, etc., diffuses 612 the emitted light between the second surface 306 and one or more light sensors 202 by minimizing or removing high intensity bright spots, generating a nearly Lambertian distribution of output light, etc. The light sensors 202 receive 616 light from the light diffuser 312 and measure 620 one or more parameters of the light from the optical element such as luminance, radiance, and chrominance for calibrating the electronic display panel 110 for performing external compensation to improve its overall uniformity and performance.

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. An apparatus for measuring characteristics of a display panel, the apparatus comprising:
an array of optical elements, each of the optical elements comprising:
a first surface configured to receive light from a plurality of pixels of the display panel, the first surface facing the display panel and having a first area;
a second surface configured to emit light, the emitted light corresponding to a combined version of the light received by the first surface, the second surface facing away from the display panel and having a second area smaller than the first area; and
a light sensor facing the second surface of each of the optical elements to measure one or more parameters of the emitted light.

2. The apparatus of claim 1, further comprising a light diffuser between the second surface and the light sensor to diffuse the emitted light.

3. The apparatus of claim 1, wherein each of the optical elements is a fiber optic taper or lightpipe.

4. The apparatus of claim 1, wherein each of the optical elements is funnel shaped.

5. The apparatus of claim 1, wherein each of the optical elements has a curved side surface that extends between the first surface and the second surface.

6. The apparatus of claim 1, wherein the array of optical elements covers an entire display surface of the display panel.

7. The apparatus of claim 1, wherein first surfaces have a collective area smaller than an area of a display surface of the display panel, and further comprising an actuator to move the array of optical elements in a direction parallel to the display surface of the display panel.

8. The apparatus of claim 7, wherein a length of the array of optical elements coincides with a length of the display surface of the display panel, the actuator moving the array of optical elements between an edge of the display surface and an opposite edge of the display surface.

9. The apparatus of claim 1, wherein the one or more measured parameters include at least one of luminance, radiance, and chrominance of the emitted light.

10. A method for measuring characteristics of a display panel, the method comprising:
receiving, by a first surface of an optical element, light from a plurality of pixels of the display panel, the first surface facing the display panel and having a first area;
combining the received light at the first surface by transmitting the received light through the optical element from the first surface to a second surface of the optical element;
emitting the combined light by the second surface, the second surface facing away from the display panel and having a second area smaller than the first area;
receiving, by a light sensor facing the second surface, the emitted light; and
measuring one or more parameters of the emitted light received by the light sensor.

11. The method of claim 10, further comprising diffusing the emitted light, by a light diffuser, between the second surface and the light sensor.

12. The method of claim 10, wherein the optical element is a fiber optic taper or lightpipe.

13. The method of claim 10, wherein the optical element is funnel shaped.

14. The method of claim 10, wherein the optical element has a curved side surface that extends between the first surface and the second surface.

15. The method of claim 10, wherein the optical element is one of an array of optical elements, and further comprising:
covering, by the array of optical elements, an entire display surface of the display panel.

16. The method of claim 15, further comprising:
moving, by an actuator, the array of optical elements in a direction parallel to the display surface of the display panel.

17. The method of claim 16, further comprising:
moving, by the actuator, the array of optical elements between an edge of the display surface and an opposite edge of the display surface.

18. The method of claim 10, wherein the one or more measured parameters include at least one of luminance, radiance, and chrominance of the emitted light.

* * * * *